(12) United States Patent
Zhu et al.

(10) Patent No.: US 9,185,746 B2
(45) Date of Patent: Nov. 10, 2015

(54) DUAL-MODE MOBILE TERMINAL

(75) Inventors: Dalong Zhu, Shenzhen (CN); Yimu Hu, Shenzhen (CN)

(73) Assignee: ZTE CORPORATION (CN)

( * ) Notice: Subject to any disclaimer, the term of this patent is extended or adjusted under 35 U.S.C. 154(b) by 236 days.

(21) Appl. No.: 14/005,326

(22) PCT Filed: Jun. 9, 2011

(86) PCT No.: PCT/CN2011/075549
§ 371 (c)(1),
(2), (4) Date: Sep. 16, 2013

(87) PCT Pub. No.: WO2012/122750
PCT Pub. Date: Sep. 20, 2012

(65) Prior Publication Data
US 2014/0011536 A1    Jan. 9, 2014

(30) Foreign Application Priority Data
Mar. 14, 2011  (CN) .......................... 2011 1 0060553

(51) Int. Cl.
| | |
|---|---|
| *H04B 1/04* | (2006.01) |
| *H01Q 11/12* | (2006.01) |
| *H04W 88/06* | (2009.01) |
| *H04B 1/10* | (2006.01) |

(Continued)

(52) U.S. Cl.
CPC ............... *H04W 88/06* (2013.01); *H04B 1/005* (2013.01); *H04B 1/10* (2013.01); *H04B 1/18* (2013.01); *H04B 1/406* (2013.01)

(58) Field of Classification Search
USPC ............. 455/127.4, 550.1, 552.1, 553.1, 407, 455/411, 425, 556.2, 566
See application file for complete search history.

(56) References Cited

U.S. PATENT DOCUMENTS 5,625,894 A *  4/1997  Jou ................................. 455/78
7,884,684 B1 *  2/2011  Seward et al. ................ 333/129

(Continued)

FOREIGN PATENT DOCUMENTS

CN        1922793 A      2/2007
CN      101873382 A     10/2010

(Continued)

OTHER PUBLICATIONS

International Search Report for corresponding application PCT/CN2011/075549 filed Jun. 9, 2011: mail date Dec. 22, 2011.

*Primary Examiner* — Dominic E Rego
(74) *Attorney, Agent, or Firm* — Cantor Colburn LLP

(57) ABSTRACT

Provided in the disclosure is a dual-mode mobile terminal. The dual-mode mobile terminal includes: a CMMB antenna embedded in the dual-mode mobile terminal; a CMMB protection network connected to the CMMB antenna, comprising multiple stages of circuits connected successively, wherein each stage of circuit in the multiple stages of circuits is an LC series circuit or an LC parallel circuit, two ends of the LC parallel circuit are connected between the stages of circuits before and after the LC parallel circuit, and one end of the LC series circuit is connected between the stages of circuits before and after the LC series circuit, and the other end of the LC series circuit is grounded. According to the technical solution provided by the disclosure, the interference problem among multiple antennas in the CMMB antenna embedding solution in the related art is solved, thus being able to reduce the interference to CMMB signals by multi-mode radio frequency signals.

20 Claims, 4 Drawing Sheets

(51) Int. Cl.
*H04B 1/00* (2006.01)
*H04B 1/18* (2006.01)
*H04B 1/403* (2015.01)

(56) References Cited

U.S. PATENT DOCUMENTS

2002/0173337 A1* 11/2002 Hajimiri et al. ............... 455/552
2010/0309825 A1* 12/2010 Zhang ........................... 370/278
2011/0050522 A1* 3/2011 Kuo ............................... 343/728
2012/0079010 A1* 3/2012 Song ............................. 709/203

FOREIGN PATENT DOCUMENTS

| CN | 201639571 U | 11/2010 |
| CN | 201717941 U | 1/2011 |
| JP | 2005311536 A | 11/2005 |

* cited by examiner

DUAL-MODE MOBILE TERMINAL

TECHNICAL FIELD

The disclosure relates to the field of communications, and particularly, to a dual-mode mobile terminal.

BACKGROUND

With the advent of 3G era, mobile communications have fully come into 3G era. Currently, there are three 3 G communication standards in the world, which are respectively wideband code division multiple access (WCDMA), code division multiple access 2000 (CDMA2000), and time division-synchronized code division multiple access (TD-SCDMA). TD-SCDMA is an international standard proposed by China and recognized by the International Telecom Standardization Organization, and China possesses the core proprietary intellectual property rights. Currently, China mobile TD-SCDMA network has obtained 85 MHz frequency accumulatively, which are respectively 20 MHz (1880-1900 MHz) in F band, 15 MHz (2010-2025 MHz) in A band and 50 MHz (2320-2370 MHz) in E band, wherein E band now is merely allowed to be used for indoor coverage.

However, since the current TD-SCDMA network is not mature enough, we have to face the problem that the network coverage is not comprehensive enough. In order to solve this problem, it is considered to use other networks to improve the coverage problem, and the global system for mobile communication (GSM) network is a supplement with the best cost performance. Therefore, currently, the applications of TD-SCDMA and GSM dual-mode mobile terminals are very common.

China mobile multimedia broadcasting (CMMB) employs the mobile TV reception standard STiMi autonomously developed by China. This standard is suitable for broadcast service frequencies in the range from 30 MHz to 3000 MHz, and a broadcast system which transmits multimedia signals such as TV, broadcast, data information and so on wirelessly through satellites and the ground can realize domestic roaming. CMMB is a special service of 3G applications, and due to the portability and applicability of the mobile terminal, CMMB TV has wider influence and application prospect than common TV. CMMB employs two sets of receiving systems to support U waveband (470 MHz-798 MHz) and S waveband (2635-2660 MHz) simultaneously, wherein U waveband receives signals from a ground forwarding network, and S waveband receives TV broadcast signals from satellites. Currently, mobile terminals with CMMB functions in China use U waveband.

CMMB antenna is an important constituent part of the air interface of a mobile terminal with the CMMB functions, and the function of the CMMB antenna is to complete the wireless communication between a CMMB mobile terminal and a transmitting station by receiving wireless signals from the transmitting station. The quality of the CMMB service depends to a certain extent on the performance of the CMMB antenna. Currently, the CMMB antenna commonly used in industry is external rod antenna. In the mobile telephone design, the external antenna is gradually replaced with embedded antenna. It is proven that with respect to the antenna efficiency which is the most critical electrical parameter to the application of the mobile terminal, an embedded antenna with good design can provide the same performance as the external antenna. At the same time, the requirements on a more fashionable appearance from the consumer further urge the mobile phone manufacturer to integrate the antenna inside the device. As compared to the external antenna, the embedded antenna has the same performance, better appearance characteristics and is more rigid, and therefore, the change from the external antenna to the embedded antenna has become an irreversible trend, and the embedding solution of the CMMB antenna and the application and development of the corresponding mobile terminal are also a trend.

However, the operating band of a dual-mode terminal (such as TD-SCDMA/GSM dual-mode mobile phone) is relatively wide, including bands such as GSM 900, DCS 1800, PCS 1900, TD 1.9G and TD 2.1G and so on. For reducing the interference among multiple antennas in the CMMB antenna embedding solution, improving the receiving sensitivity of the CMMB antenna, and ensuring good CMMB antenna receiving performance and so on, a reliable solution and implementation method are required.

SUMMARY

With respect to the interference problem among multiple antennas in the CMMB antenna embedding solution in the related art, the disclosure provides a dual-mode mobile terminal so as to solve at least one of the above-mentioned problems.

According to the disclosure, a dual-mode mobile terminal is provided.

The dual-mode mobile terminal according to the disclosure includes: a China mobile multimedia broadcasting (CMMB) antenna embedded in the dual-mode mobile terminal; a CMMB protection network connected to the CMMB antenna, wherein the CMMB protection network includes: multiple stages of circuits connected successively, wherein each stage of circuit in the multiple stages of circuits is an LC series circuit or an LC parallel circuit, two ends of the LC parallel circuit are connected between the stages of circuits before and after the LC parallel circuit, and one end of the LC series circuit is connected between the stages of circuits before and after the LC series circuit, and the other end of the LC series circuit is grounded.

The dual-mode mobile terminal further includes: an antenna matching network connected between the CMMB antenna and the CMMB protection network, wherein the antenna matching network includes one of the following matching circuits: a T-shaped LC circuit, an L-shaped LC circuit, a Π-shaped LC circuit, a T-shaped RC circuit, an L-shaped RC circuit, and a Π-shaped RC circuit.

The antenna matching network further includes: a transient voltage suppression (TVS) diode, with the negative electrode thereof being connected to the matching circuit and the positive electrode thereof being grounded.

The dual-mode mobile terminal further includes: a low-noise amplifier (LNA) circuit connected to the CMMB protection network.

The dual-mode mobile terminal further includes: an LNA matching attenuation network connected to the LNA circuit, wherein the LNA matching attenuation network includes an L-shaped LC circuit and a Π-shaped resistance attenuator which are connected in series.

The attenuation value of the Π-shaped resistance attenuator is greater than or equal to 2 dB.

The dual-mode mobile terminal further includes: a control network connected to the LNA circuit and configured to provide an operating voltage and a bias voltage of LNA for the LNA circuit.

The control network includes a baseband processing chip.

The CMMB antenna includes: a windingly wiring antenna body and an antenna support.

The distance between the CMMB antenna and a dual-mode antenna of the dual-mode mobile terminal is greater than a predetermined threshold.

The dual-mode mobile terminal is a time division-synchronized code division multiple access (TD-SCDMA) and global system for mobile communication (GSM) mobile terminal, the multiple stages of circuits are four stages of circuits, wherein the four stages of circuits include: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

By way of the disclosure, a CMMB antenna is embedded in the dual-mode mobile terminal and a CMMB protection network is employed to effectively suppress dual-mode signals of a dual-mode mobile terminal (such as TD-SCDMA and GSM signals of a TD-SCDMA/GSM mobile phone), the interference problem among multiple antennas in the CMMB antenna embedding solution in the related art is solved, thus being able to reduce the interference to CMMB signals by radio frequency signals such as TD-SCDMA and GSM radio frequency signals.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
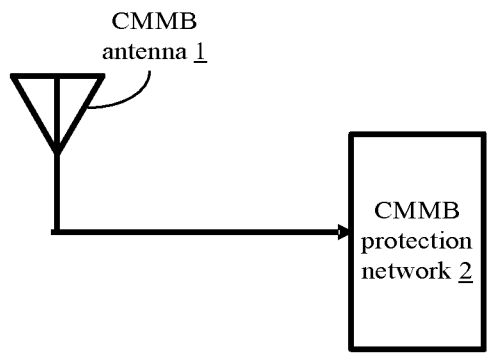
FIG. 1 is a structural schematic diagram of a dual-mode mobile terminal according to an embodiment of the disclosure.

FIG. 1 is a structural schematic diagram of a dual-mode mobile terminal according to an embodiment of the disclosure. As shown in FIG. 1, the dual-mode mobile terminal includes: a CMMB antenna 1 and a CMMB protection network 2.

The CMMB antenna 1 is embedded in the dual-mode mobile terminal.

The CMMB protection network 2 is connected to the CMMB antenna 1 and includes: multiple stages of circuits connected successively, wherein each stage of circuit in the multiple stages of circuits is an LC series circuit or an LC parallel circuit, one end of the LC series circuit is connected between the stages of circuits before and after the LC series circuit, and the other end of the LC series circuit is grounded.

A CMMB antenna is embedded in the dual-mode mobile terminal and multiple stages of LC series or parallel circuits of a CMMB protection network are employed to effectively suppress dual-mode signals of a dual-mode mobile terminal (such as TD-SCDMA and GSM signals of a TD-SCDMA/GSM mobile phone), the interference problem among multiple antennas in the CMMB antenna embedding solution in the related art is solved, thus being able to reduce the interference to CMMB signals by multi-mode radio frequency signals.

Figure 2:
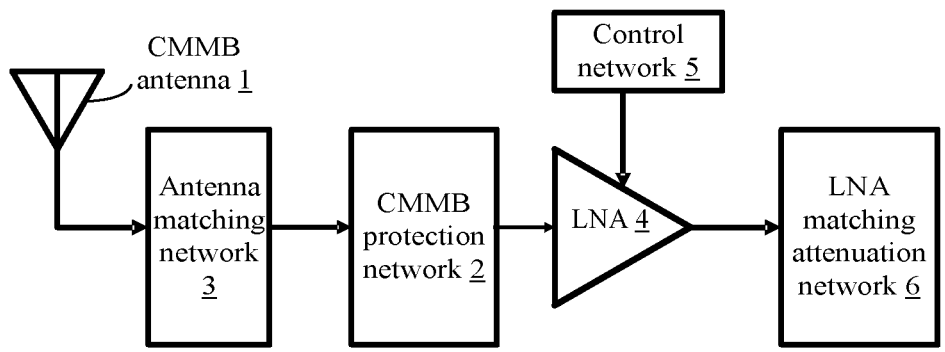
FIG. 2 is a structural schematic diagram of a dual-mode mobile terminal according to a preferred embodiment of the disclosure.

Preferably, as shown in FIG. 2, the dual-mode mobile terminal may further include: an antenna matching network 3 connected between the CMMB antenna 1 and the CMMB protection network 2 and being able to perform matching according to different forms of antennas to realize best antenna port input standing waves and achieve effective power transmission.

During specific implementation, the above-mentioned antenna matching network 3 may include one of the following matching circuits: a T-shaped LC circuit, an L-shaped LC circuit, a Π-shaped LC circuit, a T-shaped RC circuit, an L-shaped RC circuit, and a Π-shaped RC circuit.

Furthermore, in order to realize the purpose of lightning protection, a TVS diode may be provided in the antenna matching network 3, with the negative electrode thereof being connected to the matching network and the positive electrode thereof being grounded.

The above-mentioned preferred implementation will be described in conjunction with the example shown in FIG. 3.

Figure 3:
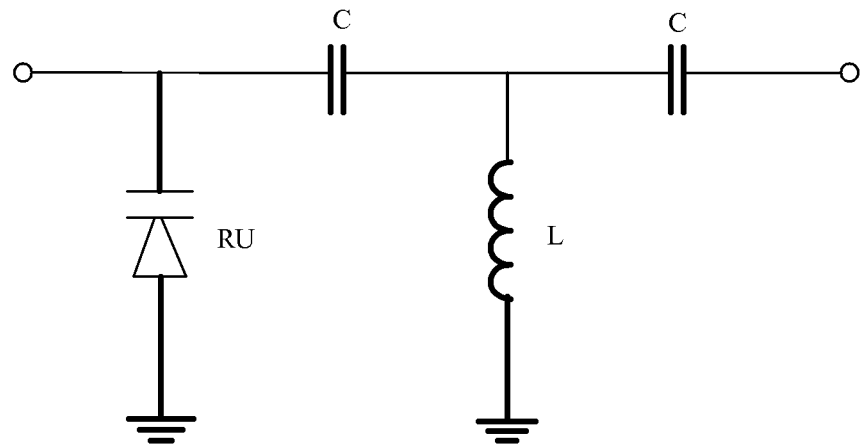
FIG. 3 is a circuit diagram of an antenna matching network according to an example of the disclosure.

FIG. 3 is a circuit diagram of an antenna matching network according to an example of the disclosure. As shown in FIG. 3, the antenna matching network includes a TVS diode and an LC circuit, which LC circuit is an L-shaped circuit. During specific implementation, a T-shaped LC circuit or a Π-shaped LC circuit can also be employed, and of course, a T-shaped RC circuit, an L-shaped RC circuit, or a Π-shaped RC circuit can also be employed.

In order to meet application scenarios of different CMMB embedded antenna patterns and improve different antenna port standing waves, an LC matching circuit is connected after the antenna in this example. At the same time, in order to prevent the CMMB antenna port from thunder, the antenna matching network may also include one anti-Electro-Static discharge (anti-ESD) diode.

Preferably, as shown in FIG. 2, the dual-mode mobile terminal may also include: an LNA circuit 4 connected to the CMMB protection network 2.

Preferably, as shown in FIG. 2, the dual-mode mobile terminal may also include: a control network 5 connected to the LNA circuit 4 and configured to provide an operating voltage and a bias voltage of LNA for the LNA circuit 4.

The above-mentioned control network may further include: a baseband processing chip (not shown in FIG. 2), that is, an operating voltage and a bias voltage of the LNA can be provided for the LNA circuit 4 through the baseband processing chip. Of course, during specific implementation, other chips can also be employed to control the operation of the LNA.

The above-mentioned preferred implementation will be described in conjunction with the example shown in FIG. 4.

Figure 4:
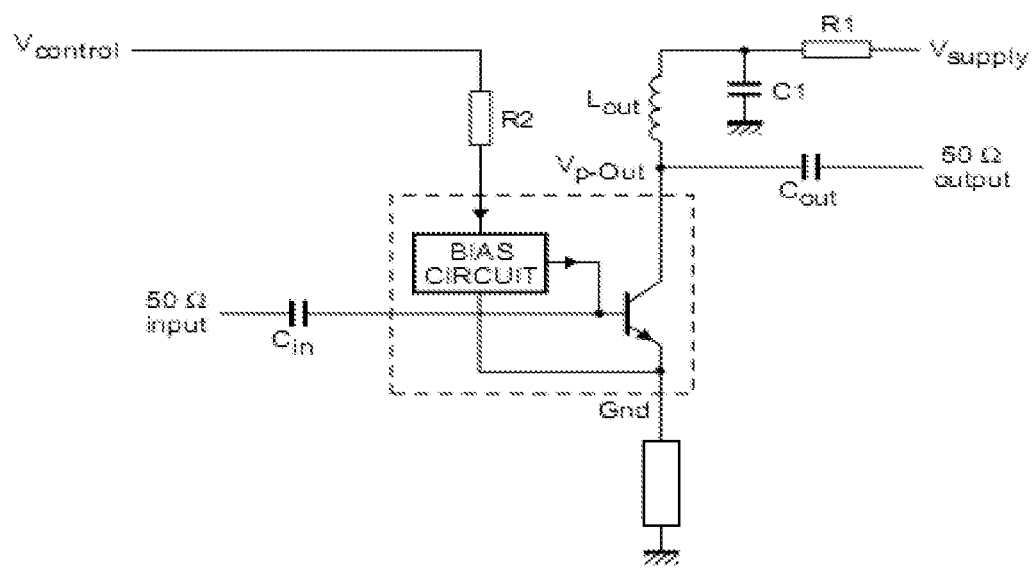
FIG. 4 is a circuit diagram of an LNA circuit according to an example of the disclosure.

FIG. 4 is a circuit diagram of an LNA circuit according to an example of the disclosure. As shown in FIG. 4, the LNA circuit may consist of one LNA and a relevant resistance and capacitance device. The LNA circuit can amplify received weak CMMB radio frequency signals, which can reduce the link noise of the entire CMMB receiving system and improve the receiving sensitivity of the CMMB antenna. At the same time, Vcontrol and Vsupply are controlled by control signals transmitted from the control network which consists of the baseband processing chip of the mobile terminal, and Vcontrol and Vsupply are enabled to control the operation of the LNA only when the user uses the CMMB functions, thus reducing the energy loss of the mobile terminal and prolonging the standby time of the mobile terminal.

Preferably, as shown in FIG. 2, the above-mentioned dual-mode mobile terminal may further include: an LNA matching attenuation network 6 connected to the LNA circuit, wherein the LNA matching attenuation network 6 includes an L-shaped LC circuit and a Π-shaped resistance attenuator which are connected in series.

The LNA matching attenuation network 6 can be employed to achieve good matching between the LNA and the subsequent stage(s) of circuit(s) and effectively transmit CMMB radio frequency signals.

The above-mentioned preferred implementation will be described in conjunction with the example shown in FIG. 5.

Figure 5:
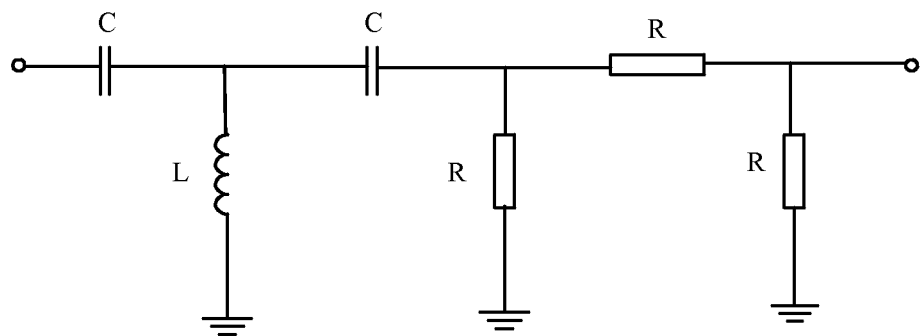
FIG. 5 is a circuit diagram of an LNA matching attenuation network according to an example of the disclosure.

FIG. 5 is a circuit diagram of an LNA matching attenuation network according to an example of the disclosure. As shown in FIG. 5, the LNA matching attenuation network consists of an L-shaped LC circuit and a Π-shaped resistance attenuator, which can realize that the LNA operates in the range of 479-798 MHz of CMMB wideband and has a relatively ideal gain flatness and noise coefficient. At the same time, in order to avoid link self-excitation, the attenuation value of the Π-shaped attenuator shall be greater than or equal to 2 dB.

Preferably, the CMMB antenna shown in FIGS. 1 and 2 receives radio frequency signals from the transmitting station and converts high frequency electromagnetic waves into a high frequency signal current. The above-mentioned CMMB antenna may further include: a windingly wiring antenna body and an antenna support. The antenna body may be made of Flexible Printed Circuit (FPC), may also be a metal steel sheet, and may also be made of other metal materials. The antenna support may be made of a non-metallic housing, and may also be a special non-metallic support.

Figure 6:
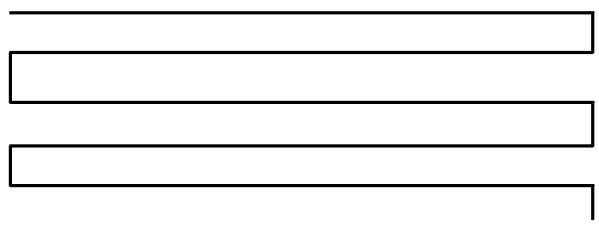
FIG. 6 is a structural schematic diagram of an embedded CMMB antenna body according to an example of the disclosure.

FIG. 6 is a structural schematic diagram of an embedded CMMB antenna body pattern according to an example of the disclosure. With the consideration of the wavelength of CMMB signals and the antenna resonance frequency point, the length of the CMMB embedded antenna is usually about 150 mm, and due to the limit of the space of a mobile terminal (such as a mobile phone), usually a windingly wiring fashion will be employed, such as employing an S-shaped wiring manner.

Preferably, the distance between the CMMB antenna and the dual-mode antenna of the dual-mode mobile terminal shall be set as far as possible, and during specific implementation, a predetermined threshold can be preset, and the distance between the CMMB antenna and the dual-mode antenna is kept greater than this predetermined threshold. For example, the dual-mode antenna (such as TD-SCDMA/GSM antenna) of the dual-mode mobile terminal can be provided in the mobile terminal as far as possible from the CMMB antenna.

During specific implementation, the TD-SCDMA/GSM dual-mode antenna and the CMMB antenna can be provided at two ends of the mobile terminal with the farthest distance. For example, the CMMB embedded antenna is provided at the top of the mobile terminal, and the TD-SCDMA/GSM dual-mode antenna is provided at the bottom of the mobile terminal, thus reducing the interference to the CMMB embedded antenna from the TD-SCDMA/GSM dual-mode antenna, further improving the receiving sensitivity of the CMMB antenna in this embedding solution, and reducing the interference to the CMMB antenna from the TD-SCDMA and GSM signals.

It should be noted that the dual-mode mobile terminal mentioned above can be any mobile terminal which supports two modes, for example, CDMA2000/GSM mobile terminal, TD-SCDMA/GSM mobile terminal and so on.

When the above-mentioned dual-mode mobile terminal is a TD-SCDMA and GSM mobile terminal, the multiple stages of circuits may be set as four stages of circuits, and the four stages of circuits include: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively. The above-mentioned preferred implementation will be described in conjunction with FIG. 7.

Figure 7:
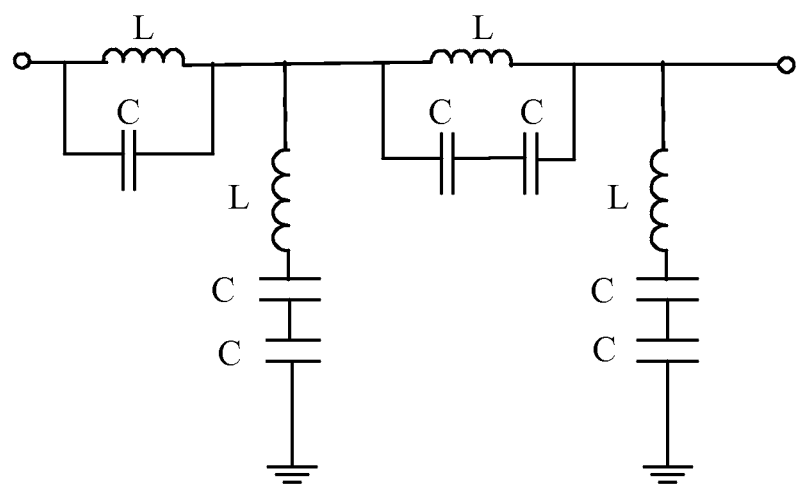
FIG. 7 is a circuit diagram of a CMMB protection network according to an example of the disclosure.

FIG. 7 is a circuit diagram of a CMMB protection network according to an example of the disclosure. As shown in FIG. 7, this CMMB protection network consists of four stages of LC series/parallel resonant circuits, specifically, two parallel LC circuits and two series LC circuits. The two parallel stages resonant at DCS 1800 transmitting and TD transmitting bands, and the two series stages resonant at the GSM transmitting band respectively. By way of these four stages of series/parallel resonant circuits, the TD-SCDMA and GSM signals of a TD-SCDMA/GSM dual-mode mobile phone can be suppressed effectively, avoiding blocking and protecting a subsequent stage of LNA. In order to achieve relatively ideal effects, the insertion loss of the CMMB protection network is required not to exceed 3 dB, and the standing wave thereof is required to be less than 2 dB. The CMMB out-of-band frequency band suppression of 470 MHz-798 MHz is required to be greater than 25 dB at GSM 900 band, greater than 20 dB at DCS 1800 band, greater than 17 dB at TD 1.9G band, and greater than 25 dB at TD 2.1G band.

The CMMB protection network provided between the antenna port and the LNA circuit can not only reduce the interference to the CMMB signals from the TD-SCDMA and GSM radio frequency signals but can also prevent the LNA being damaged due to a large signal from the antenna port being poured into a subsequent stage of circuit.

Preferably, the above-mentioned CMMB antenna embedding solution can also be combined with an external antenna solution, to further improve the performance of the external CMMB antenna.

In summary, by virtue of the above-mentioned embodiments provided by the disclosure, not only the external CMMB rod antenna can be removed from the dual-mode mobile terminal, effectively improving user experience, but also the interference among multiple antennas in the CMMB antenna embedding solution can be reduced, improving the receiving sensitivity of the CMMB antenna, and ensuring good receiving performance of the CMMB antenna.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A dual-mode mobile terminal, comprising:
   a China mobile multimedia broadcasting (CMMB) antenna embedded in the dual-mode mobile terminal;
   a CMMB protection network connected to the CMMB antenna, wherein the CMMB protection network comprises: multiple stages of circuits connected successively, wherein each stage of circuit in the multiple stages of circuits is an LC series circuit or an LC parallel circuit, two ends of the LC parallel circuit are connected between the stages of circuits before and after the LC parallel circuit, and one end of the LC series circuit is connected between the stages of circuits before and after the LC series circuit, and the other end of the LC series circuit is grounded.

2. The dual-mode mobile terminal according to claim 1, further comprising:
   an antenna matching network connected between the CMMB antenna and the CMMB protection network, wherein the antenna matching network comprises one of the following matching circuits: a T-shaped LC circuit, an L-shaped LC circuit, a Π-shaped LC circuit, a T-shaped RC circuit, an L-shaped RC circuit, and a Π-shaped RC circuit.

3. The dual-mode mobile terminal according to claim 2, wherein the antenna matching network further comprises:
   a transient voltage suppression (TVS) diode, with the negative electrode thereof being connected to the matching circuit and the positive electrode thereof being grounded.

4. The dual-mode mobile terminal according to claim 3, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

5. The dual-mode mobile terminal according to claim 2, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

6. The dual-mode mobile terminal according to claim 1, further comprising:
   a low-noise amplifier (LNA) circuit connected to the CMMB protection network.

7. The dual-mode mobile terminal according to claim 6, further comprising:
   an LNA matching attenuation network connected to the LNA circuit, wherein the LNA matching attenuation network comprises an L-shaped LC circuit and a Π-shaped resistance attenuator which are connected in series.

8. The dual-mode mobile terminal according to claim 7, wherein the attenuation value of the Π-shaped resistance attenuator is greater than or equal to 2 dB.

9. The dual-mode mobile terminal according to claim 8, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

10. The dual-mode mobile terminal according to claim 7, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

11. The dual-mode mobile terminal according to claim 6, further comprising:
    a control network connected to the LNA circuit and configured to provide an operating voltage and a bias voltage of LNA for the LNA circuit.

12. The dual-mode mobile terminal according to claim 11, wherein the control network comprises a baseband processing chip.

13. The dual-mode mobile terminal according to claim 12, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

14. The dual-mode mobile terminal according to claim 11, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

15. The dual-mode mobile terminal according to claim 6, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

16. The dual-mode mobile terminal according to claim 1, wherein the CMMB antenna comprises: a windingly wiring antenna body and an antenna support.

17. The dual-mode mobile terminal according to claim 16, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

18. The dual-mode mobile terminal according to claim 1, wherein the distance between the CMMB antenna and a dual-mode antenna of the dual-mode mobile terminal is greater than a predetermined threshold.

19. The dual-mode mobile terminal according to claim 18, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

20. The dual-mode mobile terminal according to claim 1, wherein the dual-mode mobile terminal is a time division-synchronized code division multiple access (TD-SCDMA) and global system for mobile communication (GSM) mobile terminal, the multiple stages of circuits are four stages of circuits, wherein the four stages of circuits comprise: two stages of LC parallel circuits and two stages of LC series circuits, wherein the two stages of LC parallel circuits resonate at DSC 1800 transmitting and TD transmitting bands, and the two stages of LC series circuits resonate at GSM transmitting band respectively.

* * * * *